Jan. 13, 1953 N. E. HART 2,625,444
WEIGHING SCALE STABILIZING MECHANISM
Filed Aug. 22, 1950 2 SHEETS—SHEET 1
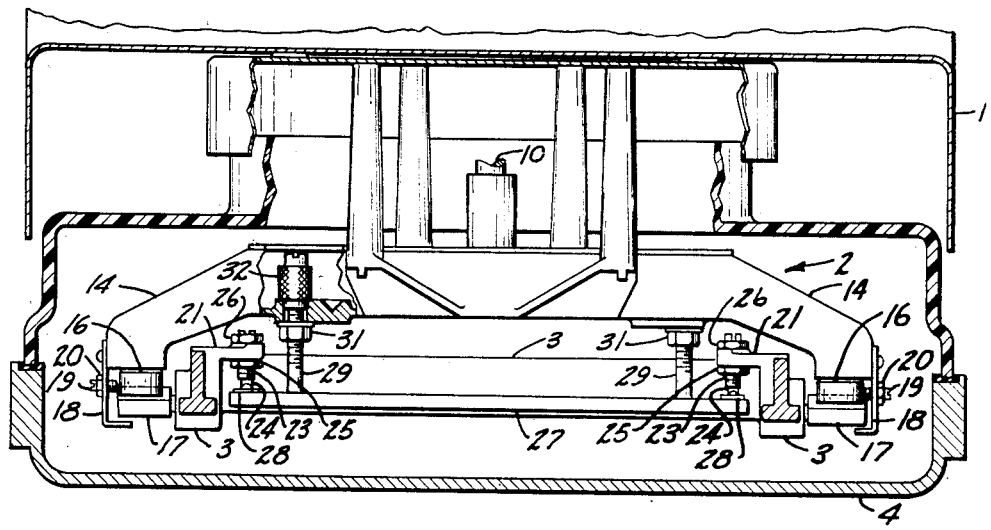
Fig. II
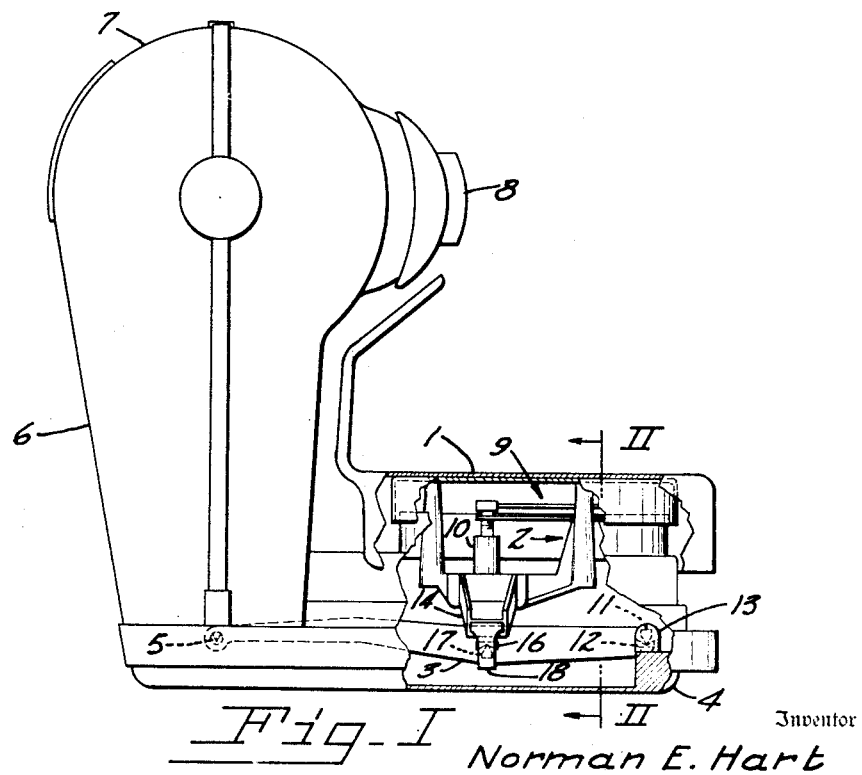
Fig. I
Inventor
Norman E. Hart
By
Marshall and Marshall
Attorney Jan. 13, 1953 N. E. HART 2,625,444
WEIGHING SCALE STABILIZING MECHANISM
Filed Aug. 22, 1950 2 SHEETS—SHEET 2
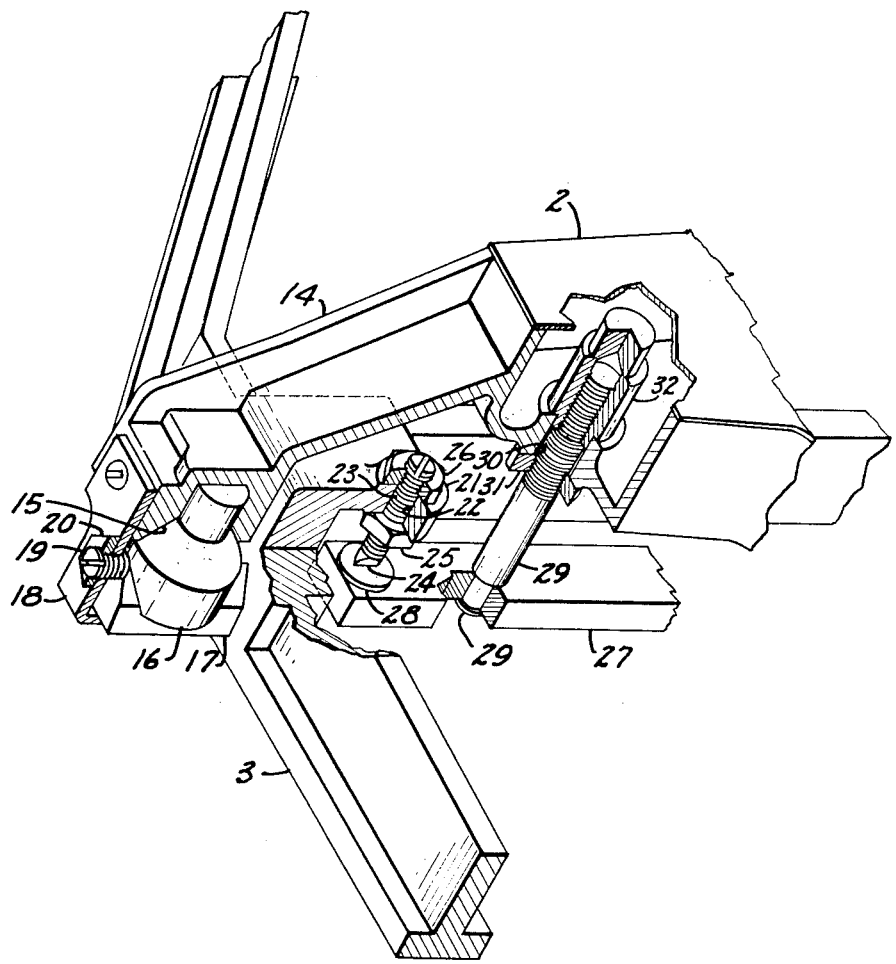
Fig. III
Inventor
Norman E. Hart
By
Marshall & Marshall
Attorneys Patented Jan. 13, 1953

2,625,444

UNITED STATES PATENT OFFICE 2,625,444

WEIGHING SCALE STABILIZING MECHANISM

Norman E. Hart, Toledo, Ohio, assignor to Toledo Scale Company, Toledo, Ohio, a corporation of New Jersey Application August 22, 1950, Serial No. 180,821

2 Claims. (Cl. 308—2)

This invention relates to weighing scales, and in particular to means for preventing derangement of the weighing mechanism when heavy loads are applied near an edge of a load receiver.

Weighing scales, particularly those intended for use in retail food stores, are commonly constructed with a single A-shaped lever that serves to support a load receiver and transmit load forces to an automatic load counter balancing mechanism. As long as the resultant of the load forces acts near the center of the load receiver, no stability problems are introduced. If, however, the load is applied near the edge of the load receiver, there is a tendency to rock the load receiver and lift one of its bearings from the cooperating knife edge pivot of the lever. Unless this lifting of the bearing from the pivot is prevented, the load receiver will tip to such an extent that the scale becomes inoperative. Various designs of stabilizing devices are now used and many others have been proposed, but these devices are either costly or introduce too much friction into the weighing mechanism.

The principal object of this invention is to provide a simple and economical method for stabilizing a weighing scale against the possibility of derangement resulting from loads applied near the edge of the load receiver.

Another object of the invention is to provide stabilizing means, the parts of which do not transmit force except that force required to prevent the lifting of a bearing from its cooperating pivot.

Another object of the invention is to provide stabilizing means that are easily adjusted to introduce a minimum of friction and to retain this adjustment during use.

Another object of the invention is to provide a stabilizing means, easily assembled and disassembled and adjusted in relation to a predetermined pivoting axis without the use of delicate or special tools.

These and other objects and advantages will be apparent from the following description of a preferred form of the invention. The invention consists in a mounting for a bar carrying parts of a pivotal axis stabilizing mechanism, which bar depends from a weighing scale spider and is supported by threaded studs that are easily and automatically adjusted into proper position by a knurled cap nut and a lock nut to allow a minimum of clearance between a pivot carried on the weighing scale lever and the bearing of the stabilizing mechanism.

In the preferred form the stabilizing means is used with a load carrying knife edge and bearing and comprises, in first part of lever, a knife edge pivot in line with the pivoting axis of the load pivot, which pivot cooperates with a flat bearing of a bar adjustably mounted in the second part, said pivot and flat bearing transmitting force as required to prevent separation of said parts.

The improved stabilizing means provides a substantially friction free resistance against separation of the load carrying knife edge and bearing because the knife edge of the stabilizing means does not contact its bearing, except when force is required to prevent the bearing from lifting from the knife edge, then the stabilizing force is transmitted to the first part or lever through a knife edge which is in line with the load knife edge.

The improved construction also allows the knife edge that cooperates with the stabilizing means to be accurately aligned with the load carrying knife edge of the lever. This feature is important in that its permits the stabilizing means to be adjusted for minimum clearance and yet maintain that clearance throughout the normal operation of the scale.

The preferred form of the invention is illustrated in the accompanying drawings.

In the drawings:

Figure I is a side elevation, with parts broken away, of a weighing scale embodying the improved stabilizing means.

Figure II is a vertical section taken substantially along the line II—II of Figure I.

Figure III is a fragmentary isometric view, with parts broken way, of the cooperating portions of the pivotally connected parts and the improved stabilizing mechanism.

These specific figures and the accompanying descriptoin are intended merely to illustrate the invention but not to limit its scope.

A weighing scale in which the improved stabilizing means may be employed has a load receiver 1 secured to a spider 2 that is pivotally supported on a lever 3. The lever 3, which is substantially triangular in plane, is fulcrumed at the front corners of a base 4 of the scale and has its power pivot 5, at the apex of its general triangular shape, located beneath a substantially rectangular column 6 erected from the rear of the base 4. A generally cylindrical housing 7 surmounts the column 6 and houses a rotatable indicia-bearing chart, that may be viewed through a magnifying lens 8 extending from the housing 7. Either a spring or a pendulum load counterbalancing mechanism connected to the power pivot 5 and housed within the column 6 rotates the indicia-bearing chart through angles proportional to the load forces transmitted from the load receiver 1 through the lever 3.

To prevent rocking of the spider 2 about its pivotal connection to the lever 3, a check link 9 is pivotally connected to the spider 2 at the upper end of a post 10 and is similarly connected to the base 4 or other fixedly located part of the scale. Adjustments at each end of the check link 9 permit the line of action of the check link 9 to be made precisely parallel to the pivot line of the load receiving lever 3.

Still referring to Figure I, the wide end of the lever 3 is provided with tenon-shanked fulcrum pivots 11 extending laterally from the lever and resting in V-bearings 12 mounted in the front corners of the base 4. The V-bearings 12 are made self-aligning by forming a portion of their surface to the contour of a sphere, the center of which lies in the center of the V-groove in the bearing. The spherical portion of the bearing 12 rests in a conical portion of a drilled and countersunk hole cut in the base 4. A cylindrical shank formed integrally with the V-bearing 12 is loosely engaged in the drilled portion of the drilled and countersunk hole to limit the freedom of movement of the V-bearing 12. Caps 13 are provided to protect the pivots and V-bearings from dirt or dust and to receive any lateral thrust forces that may be introduced into the scale.

Referring now to Figure II, a laterally extending arm 14 of the spider 2 has a drilled and countersunk hole 15 (Figure III) that receives a spherical seated V-groove bearing 16. The V-bearing 16 pivotally rests on a load pivot 17 that extends laterally from the mid-portion of a side of the lever 3. A cap 18 secured to an end of the arm 14 has a portion reaching downwardly and under the load pivot 17. A thrust screw 19 secured by a lock nut 20 is threaded through the cap 13 in axial alignment with the knife edge of the pivot 17 and serves as a thrust bearing to maintain the bearing 16 in position along the knife edge of the pivot 17.

If a load placed on the load receiver 1 is within the area defined as being directly above and between the V-bearings 16, the force of the load is divided or distributed between the V-bearings 16 and, since each of the pivots is subjected to a downward force, the V-bearings 16 are maintained in operative positions on the knife edge pivots 17. If, however, the load is concentrated toward one side or the other of the load receiver 1 so that the resultant of the load forces falls between one of the pivots 17 and the adjacent edge of the load receiver 1, the opposite pivot 17 and bearing 16 are completely relieved of load and that arm 14 of the spider 2 tends to lift until its upward motion is limited by the cap 18. The area of the resulting contact between the pivot 17 and the cap 18 introduces a serious amount of friction into the scale as well as producing actual change in load indication.

In order to prevent disengagement of the pivots 17 from the V-bearings 16 resting thereon, the lever 3 is provided with bosses 21 located above and symmetrically with respect to the load pivots 17. Each boss has a hole 22 to receive a threaded end 23 of a stabilizing knife edge pivot 24. The stabilizing pivot 24 is aligned with the load pivot 17 by a first lock nut 25 and is positioned securely in place by another or second lock nut 26.

A stabilizing bar 27 having flat bearing surfaces 28 fixed in its upper surface near its ends to cooperate with the stabilizing pivots 24 is supported from the laterally extending arms 14 of the spider 2 by a pair of studs 29 riveted or otherwise secured in the stabilizing bar 27 and extending upwardly through holes 30 in the arms 14. The studs are threaded to receive lock nuts 31 abutting the lower surfaces of the arms 14 and knurled cap nuts 32 abutting the upper surfaces of the arms 14.

In the manufacture and adjustment of the lever 3 the stabilizing pivots 24 are brought into accurate alignment with the load pivots 17. The bearing surfaces 28 are accurately located with respect to the pivots during assembly of the scale by first tightening the knurled cap nuts 32 until the bearing surfaces 28 are firmly in contact with the pivots 24. The lock nuts 31 abutting the lower surfaces of the arms are then tightened thus tending to lower the studs 29 with respect to the arms 14. The yield of the metal of the arms 14 and the stretch of the studs 29 between the nuts provides just sufficient movement to separate the bearing surfaces 28 from contact with the pivots 24.

This adjustment of the stabilizing bar 27 with respect to the spider 2 to obtain proper working clearance of the knife edge pivots is automatic in that merely observing the proper order of tightening the nuts 31 and 32 leaves the parts in proper position.

There is no need for special tools and the adjustment or assembly of the spider on the lever may be carried out by a service man on a repair call as easily as by a mechanic in the factory.

The final adjustment of the stabilizing bar leaves the pivots 24 very close to but not in contact with the bearing surfaces 28. There is thus no interference with normal operation of the scale mechanism. If a load applied to the edge of the load receiver 1 tends to tip the load receiver, the bearing surface 28 immediately contacts the pivot 24 as the spider bearing 16 lifts from the load pivot 17. Since the pivots 16 and 24 are accurately in line there is no change in lever ratio as the shift from one pivot to the other occurs and the accuracy of load indication is not affected.

This improved construction of stabilizing mechanism provides a simple, easily constructed, inexpensive mechanism for preventing derangement of a pivot and bearing when the scale is subjected to off-center loads. The assembly of a scale embodying the improved mechanism is materially simplified by the automatic adjustment of operating clearances provided by the order of tightening of the nuts holding the stabilizing bar to the spider of the scale.

Various modifications of specific details of construction may be made without departing from the spirit and scope of the invention.

Having described the invention, I claim:

1. In a weighing scale pivot stabilizing assembly, in combination, a pair of auxiliary pivots having edges aligned with and oppositely directed to the edges of force transmitting pivots of a lever, a bar having flat bearings opposed to the auxiliary pivots, a member that is pivotally connected to the lever through the force transmitting pivots, a pair of studs rigidly attached to the bar and passing through holes in the member, finger engageable means threaded onto the ends of the studs and engaging the surface of the member remote from the bar for drawing the bar against the auxiliary pivots, and tool engageable means threaded on the studs and engaging the surface of the member adjacent the bar for putting the first means under stress to release the bar from contact with the auxiliary pivots.

2. In a weighing scale pivot stabilizing assembly, in combination, a pair of auxiliary pivots having edges aligned with and oppositely directed to the edges of force transmitting pivots of a lever, a bar having flat bearings opposed to the auxiliary pivots, a member that is pivotally connected to the lever through the force transmitting pivots, a pair of studs fixed in the bar and extending through holes in the member, finger adjustable means threaded on the ends of the studs and engaging the member for drawing the bar against the auxiliary pivots, and lock nuts threaded on the studs and engaging the surface of the member opposite the finger adjustable means for straining the finger adjustable means and the studs to disengage the bar from the auxiliary pivots.

NORMAN E. HART.

REFERENCES CITED

The following references are of record in the file of this patent:

UNITED STATES PATENTS

| Number | Name | Date |
| --- | --- | --- |
| 2,272,150 | Hem | Feb. 3, 1942 |
| 2,334,326 | Hem | Nov. 16, 1943 |
| 2,523,429 | Hart et al. | Sept. 26, 1950 |